(12) United States Patent
Habecker et al.

US007156893B2

(10) Patent No.: US 7,156,893 B2
(45) Date of Patent: Jan. 2, 2007

(54) METHOD OF MAKING NIOBIUM AND OTHER METAL POWDERS

(75) Inventors: Kurt A. Habecker, Douglassville, PA (US); James A. Fife, Myrtle Beach, SC (US)

(73) Assignee: Cabot Corporation, Boston, MA (US)

( * ) Notice: Subject to any disclaimer, the term of this patent is extended or adjusted under 35 U.S.C. 154(b) by 41 days.

(21) Appl. No.: 10/770,895

(22) Filed: Feb. 3, 2004

(65) Prior Publication Data

US 2005/0039577 A1 Feb. 24, 2005

Related U.S. Application Data

(62) Division of application No. 10/095,245, filed on Mar. 11, 2002, now Pat. No. 6,706,240, which is a division of application No. 09/527,053, filed on Mar. 16, 2000, now Pat. No. 6,402,066.

(60) Provisional application No. 60/184,409, filed on Feb. 23, 2000, provisional application No. 60/125,135, filed on Mar. 19, 1999.

(51) Int. Cl.
B22F 1/00 (2006.01)
H01G 9/042 (2006.01)

(52) U.S. Cl. .................................. 75/255; 361/528
(58) Field of Classification Search ................ 75/255; 361/528
See application file for complete search history.

(56) References Cited

U.S. PATENT DOCUMENTS

| | | | |
|---|---|---|---|
| 1,415,516 A | 9/1922 | Bridge | 75/614 |
| 2,242,759 A | 5/1941 | Schlect et al. | 75/395 |
| 3,169,862 A | 2/1965 | Scheller | |
| 3,288,593 A * | 11/1966 | Smith, Jr. et al. | 75/10.48 |
| 3,295,951 A | 1/1967 | Fincham et al. | 420/427 |
| 3,415,639 A * | 12/1968 | Daendliker et al. | 75/356 |
| 3,418,106 A | 12/1968 | Piettet | 75/0.5 BB |
| 3,496,076 A | 2/1970 | Cheseldine | 204/56 |
| 3,630,718 A | 12/1971 | Neuenschwander | 75/0.5 |
| 3,635,693 A | 1/1972 | Friedrich et al. | 75/0.5 BB |
| 3,647,420 A | 3/1972 | Restelli | 75/84 |
| 3,709,439 A | 1/1973 | Tundermann et al. | 241/15 |
| 3,849,124 A | 11/1974 | Villani | |
| 3,926,567 A | 12/1975 | Fletcher et al. | 29/182.5 |
| 4,009,007 A | 2/1977 | Fry | 29/182.5 |
| 4,017,302 A | 4/1977 | Bates et al. | 75/228 |
| 4,084,965 A | 4/1978 | Fry | 75/230 |
| 4,141,720 A | 2/1979 | Vartanian | 75/0.5 BB |
| 4,149,876 A | 4/1979 | Rerat | 75/0.5 |
| 4,164,455 A | 8/1979 | Aronson et al. | |
| 4,231,790 A | 11/1980 | Hahn et al. | 75/0.5 BB |
| 4,347,084 A | 8/1982 | Hahn et al. | 75/245 |
| 4,356,028 A | 10/1982 | Bates | 75/0.5 |
| 4,406,699 A | 9/1983 | Beck et al. | 75/233 |
| 4,441,927 A | 4/1984 | Getz et al. | 75/229 |
| 4,483,819 A | 11/1984 | Albrecht et al. | 419/2 |
| 4,512,805 A | 4/1985 | Albrecht et al. | 75/244 |
| 4,537,633 A | 8/1985 | Hong | 106/96 |
| 4,537,641 A | 8/1985 | Albrecht et al. | 148/11.5 |
| 4,544,403 A | 10/1985 | Schiele et al. | 75/0.5 |
| 4,548,672 A | 10/1985 | Albrecht et al. | 156/646 |
| 4,555,268 A | 11/1985 | Getz | 75/229 |
| 4,569,693 A | 2/1986 | Albrecht et al. | 75/252 |
| 4,684,399 A | 8/1987 | Bergman et al. | 75/0.5 BB |
| 4,722,756 A | 2/1988 | Hard | 148/126 |
| 4,740,238 A | 4/1988 | Schiele | 75/0.5 BB |
| 4,748,737 A | 6/1988 | Charles et al. | 29/599 |
| 4,787,561 A | 11/1988 | Kemp et al. | 241/30 |
| 4,940,490 A | 7/1990 | Fife et al. | 75/229 |
| 4,954,169 A | 9/1990 | Behrens | 75/228 |
| 5,211,741 A | 5/1993 | Fife | 7/255 |
| 5,234,491 A | 8/1993 | Chang | 75/622 |
| 5,242,481 A | 9/1993 | Kumar | 75/364 |
| 5,245,514 A | 9/1993 | Fife et al. | 361/529 |
| 5,261,942 A | 11/1993 | Fife et al. | 75/342 |
| 5,284,531 A | 2/1994 | Fife | 148/513 |
| 5,328,501 A | 7/1994 | McCormick et al. | 75/352 |
| 5,412,533 A | 5/1995 | Murayama et al. | 361/528 |
| 5,448,447 A | 9/1995 | Chang | 361/529 |
| 5,580,367 A | 12/1996 | Fife | 75/255 |

(Continued)

FOREIGN PATENT DOCUMENTS

CN    87 1 07675 A    5/1988

(Continued)

OTHER PUBLICATIONS

Peabody, "Investigation of Columbium as an Electrolytic Capacitor Anode, Part II," *U.S. Army Signal Research and Development Laboratory, DK Task Nr. 3A99-15-003-04*, pp. 1-11 (No date available).

(Continued)

Primary Examiner—Ngoclan T. Mai

(57) ABSTRACT

Methods of forming niobium powders and other metal powders are described. The method involves milling the metal powders at elevated temperatures and in the presence of at least one liquid solvent. The methods of the present invention have the ability to reduce DC leakage and/or increase capacitance capabilities of metal powders when formed into capacitor anodes. The present invention further has the ability to significantly reduce the milling time necessary to form high surface area metal powders and leads to reducing the amount of contaminants in the metal powders. Metal powders such as niobium powders having reduced amount of contaminants and/or having DC leakage or capacitance capabilities are also described. A process is further described for forming a flaked metal by wet-milling a metal powder into a flaked metal wherein at least one liquid fluorinated fluid is present during the wet-milling process. The process is particularly well suited for forming metal flakes, such as niobium or tantalum flakes, of high purity.

52 Claims, 4 Drawing Sheets

U.S. PATENT DOCUMENTS

| | | | |
|---|---|---|---|
| 5,837,030 A | 11/1998 | Schulz et al. | 75/352 |
| 6,007,597 A | 12/1999 | Puopolo et al. | 75/10.14 |
| 6,051,044 A | 4/2000 | Fife | 75/229 |
| 6,115,235 A | 9/2000 | Naito | 361/303 |
| 6,136,062 A | 10/2000 | Loffelholz et al. | 75/369 |
| 6,171,363 B1 * | 1/2001 | Shekhter et al. | 75/369 |
| 6,215,652 B1 | 4/2001 | Yoshida et al. | 361/524 |
| 6,347,032 B1 | 2/2002 | Naito | 361/303 |
| 6,375,704 B1 | 4/2002 | Habecker et al. | 75/229 |
| 6,387,150 B1 | 5/2002 | Naito | 75/245 |
| 6,402,066 B1 | 6/2002 | Habecker et al. | 241/21 |
| 6,420,043 B1 * | 7/2002 | Fife et al. | 428/472 |
| 6,423,110 B1 | 7/2002 | Naito et al. | 75/232 |
| 6,452,777 B1 | 9/2002 | Naito | 361/303 |
| 6,515,846 B1 * | 2/2003 | Tripp | 361/508 |
| 6,540,810 B1 | 4/2003 | Naito et al. | 75/255 |
| 6,558,447 B1 | 5/2003 | Shekhter et al. | 75/252 |
| 2002/0064476 A1 | 5/2002 | Omori et al. | 419/61 |
| 2002/0104404 A1 | 8/2002 | Naito | 75/245 |
| 2002/0124687 A1 | 9/2002 | Habecker et al. | 75/230 |
| 2002/0134196 A1 | 9/2002 | Naito | 75/245 |
| 2003/0026061 A1 | 2/2003 | Naito | 361/311 |
| 2003/0089197 A1 | 5/2003 | Wada | 75/255 |

FOREIGN PATENT DOCUMENTS

| | | |
|---|---|---|
| CN | 1079333 A | 12/1993 |
| DE | 4135095 A1 | 4/1993 |
| EP | 0 559 229 A1 | 5/1993 |
| EP | 0 953 847 A1 | 3/1999 |
| GB | 1123015 | 8/1965 |
| GB | 1 549 702 A | 8/1979 |
| JP | 80027601 B | 7/1980 |
| JP | 58154221 A | 9/1983 |
| JP | S60-121207 | 6/1985 |
| JP | 61-291901 A | 12/1986 |
| JP | 61 291901 A | 12/1986 |
| JP | 01084656 | 3/1989 |
| JP | 01176013 A | 7/1989 |
| JP | 04-160105 | 10/1990 |
| JP | 04 160105 A | 6/1992 |
| RU | 1057995 A | 11/1983 |
| RU | 1556420 A3 | 2/1994 |
| WO | WO 98/19811 | 5/1998 |

OTHER PUBLICATIONS

Palatnik, "Heat Field Stability and Crystallization Peculiarities of Amorphous $Nb_2O_5$ Films" *Fizika I Khimiya Obrabotki Materialov*, 5:87-94 (Feb. 7, 1980).

Eckert, "Niobium Compounds and Alloys," *Int. J. Refractory Metals and Hard Materials*, 12:335-340 (1993-1994).

Bord et al., "Quality of Niobium Oxide Semiconductor Capacitors as a Function of Chemical Composition of the Niobium Powder," No. 1(46):11-15 (1982).

Schwartz et al., "Niobium Solid Electrolytic Capacitors," *J. Electrochemical Society*, 108(8):750-757 (1961).

Al-Kharafi et al., "Phosphoric Acid Passivated Niobium and Tantalum EIS-Comparative Study," *Electrochimica Acta*, 40(16):2623-2626 (1995).

Jackson et al., "The Use of Niobium as an Anode Material in Liquid Filled Electrolytic Capacitors," *Electrocomponent Science and Technology*, 1:27-37 (1974).

*J. Electrochemical Society: Reviews and News*, 24(12):408C-409C (Dec. 1977).

Orlov et al., "Study of Oxygen Solubility in Niobium," *Izvestiya Akademii Nauk SSSR. Metally*, 5:202-205 (1985).

Krehl et al., "The Influence of Gas Atmospheres on the First-Stage Sintering of High-Purity Niobium Powders," *Metallurgical Transactions A*, 15A:1111-1116 (Jun. 1984).

Mifune et al., "Niobium Solid Electrolytic Capacitors," *National Technical Report* 9:147 (1963).

Levinsky et al., "Change in Porous Structure and Leakage Currents of Niobium Capacitor Anodes During Electrolytic Oxidation," *Poroshkovaya Metallurgiya*, 3:56-59 (1991).

Patent Abstracts of Japan, vol. 13, No. 312 (E-788). Jul. 17, 19879 & JP 01 084656A, Mar. 29, 1989 (see Abstract).

Patent Abstracts of Japan, vol. 6. No. 109 (M-137), Jun. 19, 1982 & JP 57 039043A, Mar. 4, 1982 (See Abstract).

Kuz' micheva, et al., "Superconductivity in lathanide-strontium-niobium-oxide systems" Sh. Neorg. Khim. 38(1), 162-6. (1993).

Acrivos, et al., "Dynamic phenomena in superconducting oxides measured by ESR" Phys. Rev. B: Condens. Matter, 50(18), pp. 12710-12723. (1994).

Acrivos, et al., "Dynamics of flux motion . . . " Physica C (Amsterdam) 234-40(Pt. 5), pp. 3159-3160. (1994).

International Search Report for International Application PCT/US97/19949 published May 14, 1998.

International Search Report for International Application PCT/US00/07051 dated Jul. 20, 2000.

Lü, et al., Mechanical Alloying, Kluwer Academic p. 18-19, (1998).

Futaki et al., "Ultrafine Refractory Metal Particles Produced by Hybrid Plasma Process," J. Japan Inst. Metals, vol. 56, No. 4, 1992, pp. 464-471 (with partial translation).

Krehl et al., "The Influence of Gas Atmospheres on the First-Stage Sintering of High-Purity Niobium Powders," Metallurgical Transactions A, vol. 15A, Jun. 1984, pp. 1111-1116.

Communication from European Patent Office for European Patent Application No. 00 916 452.6-2122 dated Nov. 4, 2004.

* cited by examiner

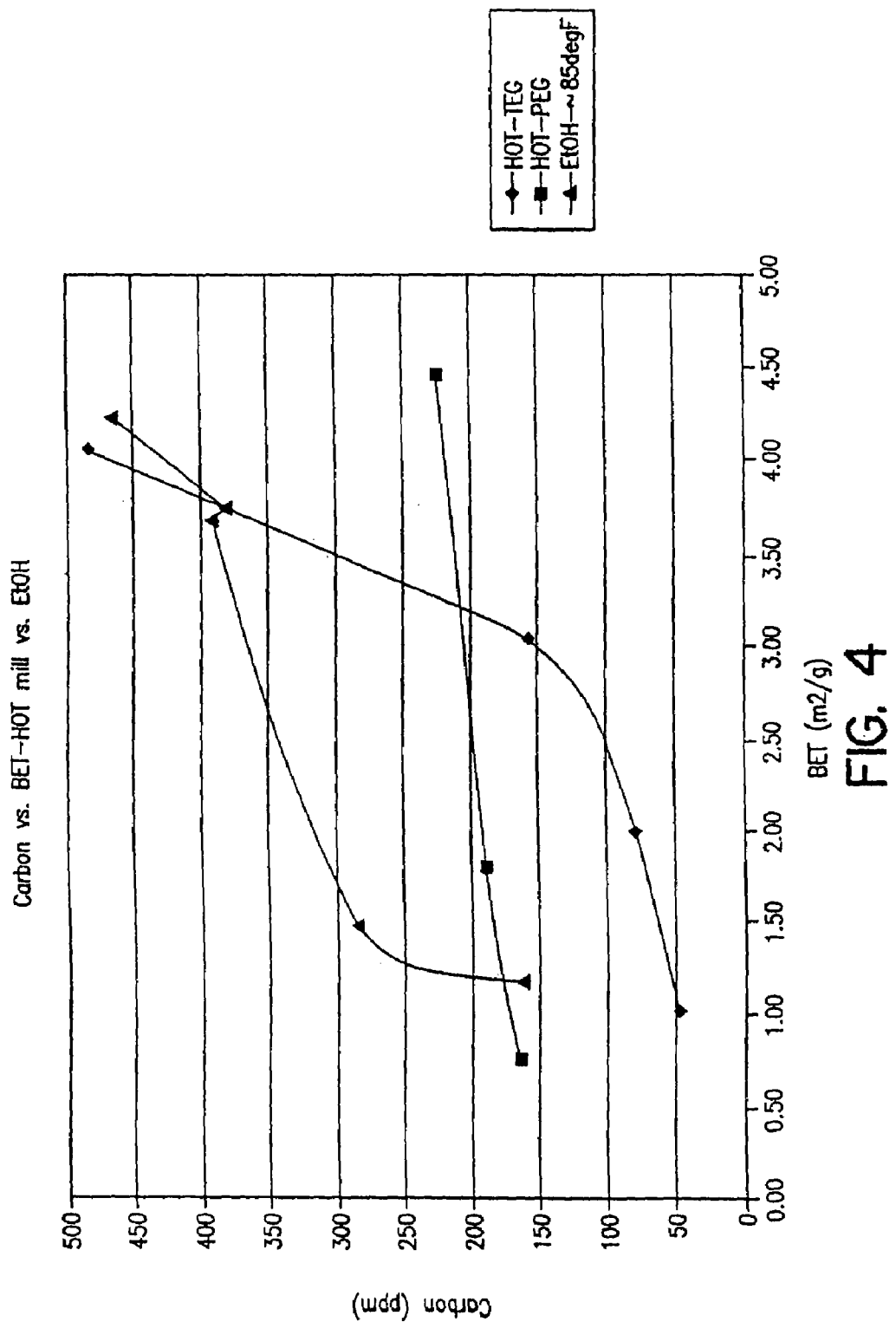

US 7,156,893 B2

METHOD OF MAKING NIOBIUM AND OTHER METAL POWDERS

This application is a divisional of U.S. patent application Ser. No. 10/095,245 filed Mar. 11, 2002, now U.S. Pat. No. 6,706,240 which in turn is a divisional of U.S. patent application Ser. No. 09/527,053 filed Mar. 16, 2000, now U.S. Pat. No. 6,402,066, which in turn claims the benefit of U.S. Provisional Patent Application No. 60/184,409 filed Feb. 23, 2000 and U.S. Provisional Patent Application No. 60/125,135 filed Mar. 19, 1999, and both provisional applications are incorporated in their entireties by reference herein.

BACKGROUND OF THE INVENTION

The present invention relates to metal powders and electrolytic capacitors using the metal powders as well as methods of making the powders and electrolytic capacitors.

For many years, it has been the goal of various researchers to develop niobium electrolytic capacitors because of the high di-electric constant of its oxide and the relatively low cost of niobium compared to a variety of other metals. Initially, researchers in this field considered the possibility of using niobium as a substitute for tantalum capacitors. Accordingly, many studies were conducted to determine the suitability of replacing tantalum with niobium.

In some of these studies, however, it was concluded that niobium has serious fundamental deficiencies that needed to be resolved, thus inferring that niobium was not an acceptable substitute for tantalum. (See J. Electrochem. Soc. p. 408 C, December 1977). In another study, one conclusion reached was that the use of niobium in solid electrolytic capacitors seems very unlikely due to various physical and mechanical problems, such as field crystallization. (Electro-component Science and Technology, Vol. 1, pp. 27–37 (1974)). Further, in another study, the researchers concluded that anodically formed passive films on niobium were different from electrical properties accomplished with tantalum and that the use of niobium led to complexities which were not present with tantalum. (See Elecrochimica Act., Vol. 40, no. 16, pp. 2623–26 (1995)). Thus, while there was initial hope that niobium might be a suitable replacement for tantalum, the evidence showed that niobium was not capable of replacing tantalum in the electrolytic capacitor market.

Besides tantalum electrolytic capacitors, there is a market for aluminum electrolytic capacitors. However, the aluminum electrolytic capacitors have dramatically different performance characteristics from tantalum electrolytic capacitors.

A driving force in electronic circuitry today is the increasing move toward lower Equivalent Series Resistance (ESR) and Equivalent Series Inductance (ESL). As IC performance increases with submicron geometry, there is a need for lower power supply voltage and noise margin. At the same time, increasing IC speeds require higher power needs. These conflicting requirements create a demand for better power management. This is being accomplished through distributed power supplies which need larger currents for decoupling noise. Increasing IC speeds also mean lower switching times and higher current transients. The electrical circuit must, therefore, also be designed to reduce the transient load response. This broad range of requirements can be met if the circuit has large enough capacitance but low ESR and ESL.

Aluminum capacitors typically provide the largest capacitance of all capacitor types. ESR decreases with increase in capacitance. Therefore, currently a large bank of high capacitance aluminum capacitors are used to meet the above requirements. However, aluminum capacitors do not really satisfy the designers' requirements of low ESR and ESL. Their mechanical construction with liquid electrolyte inherently produce ESR in the 100s of milliohm along with high impedance.

In the past, solvents such as ethanol have been used during a milling process to make metal flakes. The solvent is desirable to provide wet milling of metal to form flakes. It has been discovered that the use of alcohols and other carbon and oxygen containing solvents for wet-milling or wet-grinding of metal powders to form flakes can create a number of problems. In particular, oxygen present in wet-milling solvents can be released from the solvent due to the ease with which C—O bonds (carbon to oxygen bonds) are broken. As oxygen enters the system from the broken solvent molecules, the oxygen can react or be present with the metal flakes being formed or with stainless steel milling medium and cause impurities in the resulting flakes. It is believed that breakage of C—O bonds in wet-milling solvents leads to higher levels of carbon and iron contamination in the produced flakes and causes a resultant corrosive environment.

It is desirable to provide a wet-milling solvent which is substantially inert with respect to metal flakes being formed by the wet-milling process and with respect to the milling medium. It is also desirable to provide a wet-milling solvent which does not break down or decompose during wet-milling.

SUMMARY OF THE INVENTION

A feature of the present invention is to provide niobium powders having high capacitance and/or low leakage capability.

An additional feature of the present invention involves developing a process to lower manufacturing costs for making and/or refining niobium powders and other metal powders.

A further feature of the present invention is to provide niobium powders and other valve metals, preferably having high surface areas and physical characteristics, which permit the niobium powders and other valve metals to be formed into a capacitor having high capacitance.

Another feature of the present invention is to provide niobium powders and other valve metals which, when formed into capacitors, have a low DC leakage.

An additional feature of the present invention is to provide niobium powders and other valve metals having better impregnation properties.

A feature of the present invention is to provide wet-milled metal flakes.

A further feature of the invention is to provide wet-milled valve metal flakes, for example, flaked niobium and flaked tantalum.

Another feature of the present invention is to provide a wet-milling process which uses an inert wet-milling fluid or solvent that causes little or no contamination of metal flakes formed from the process.

Additional features and advantages of the present invention will be set forth in part in the description which follows, and in part will be apparent from the description, or may be learned by practice of the present invention.

The present invention relates to a method of making metal powder which comprises the step of milling metal powder at high temperatures and in the presence of at least one liquid solvent. This method can be combined with deoxidized treatments.

The present invention also relates to the use of fluorinated fluids or solvents and more preferably perfluorinated solvents during the wet-milling or wet-grinding of metal powders to form flaked metals, for example, niobium, tantalum, or other valve metal flakes. Typically, any amount of milling fluid can be used during the wet-milling process as long as there is a sufficient amount of fluid to permit a wet-milling or wet-grinding of the metal into flake form. Typically, for every three pounds of metal, about ½ to about 1 gallon or more of milling fluid is used.

The benefit of using fluorinated fluids and preferably perfluorinated solvents is that the resulting flaked metal will have lower oxygen levels, lower carbon levels, and/or lower iron levels then comparable flakes made using conventional alcohol milling fluids. Such lower levels of carbon and iron are desirable, particularly in valve metal flakes, since the lower the carbon level and the lower the iron level the lower the DC leakage of the resulting flaked valve metal when formed into a capacitor anode and the higher the capacitance when the flaked valve metal is formed into a capacitor anode. Further, the fluorinated fluids or solvents used in the milling process of the present invention will typically have C—F bonds as opposed to C—O bonds as in the case of ethanol, and therefore, less oxygen will enter the milling process when the fluorinated fluid is used. Furthermore, the C—F bonds of the fluorinated fluids used according to the present invention are quite strong and should remain in tact during the wet-milling process.

In addition, the present invention relates to a process to reduce contaminants involving the step of milling niobium powder or other metal powders at high temperatures and in the presence of at least one liquid solvent. Also, the present invention relates to methods to increase capacitance and/or decrease DC leakage in a capacitor anode involving the steps of milling niobium powder or other valve metals at high temperatures and in the presence of at least one liquid solvent and then forming the niobium powder or other valve metal into a capacitor anode.

The present invention further relates to a niobium powder having a carbon content of from about 40 ppm to about 200 ppm and an iron, nickel, and chromium content of from about 5 ppm to about 200 ppm.

In addition, the present invention relates to a niobium powder having a carbon amount of from about 40 to about 200 ppm when the BET surface area is about 1.0 m$^2$/g and a carbon amount of less than 250 ppm when the BET surface area of the niobium powder is from about 2 to about 4.5 m$^2$/g and the combined amount of Fe/Ni/Cr is less than 100 ppm when the BET surface area of the niobium powder is about 1.0 m$^2$/g and less than about 400 ppm when the BET surface area of the niobium powder is from about 2.0 m$^2$/g to about 4.5 m$^2$/g.

The present invention also relates to methods to reduce DC leakage in a capacitor involving milling niobium chips at elevated temperatures and in the presence of at least one liquid solvent to form niobium powder and forming said niobium powder into a capacitor anode.

Further, the present invention relates to a method of reducing the milling time to form high surface area niobium powder which involves milling niobium chips at elevated temperatures and in the presence of at least one liquid solvent to form niobium powder.

The present invention further relates to the application of the above-described methods for metal powders including valve metal powders as well as the resulting metal powders.

It is to be understood that both the foregoing general description and the following detailed description are exemplary and explanatory only and are intended to provide further explanation of the present invention, as claimed.

BRIEF DESCRIPTION OF THE DRAWINGS

FIG. 4 is a graph showing the amount of carbon impurities present in niobium powders having various BET surface areas and prepared differently.

DETAILED DESCRIPTION OF THE PRESENT INVENTION

Figure 1:
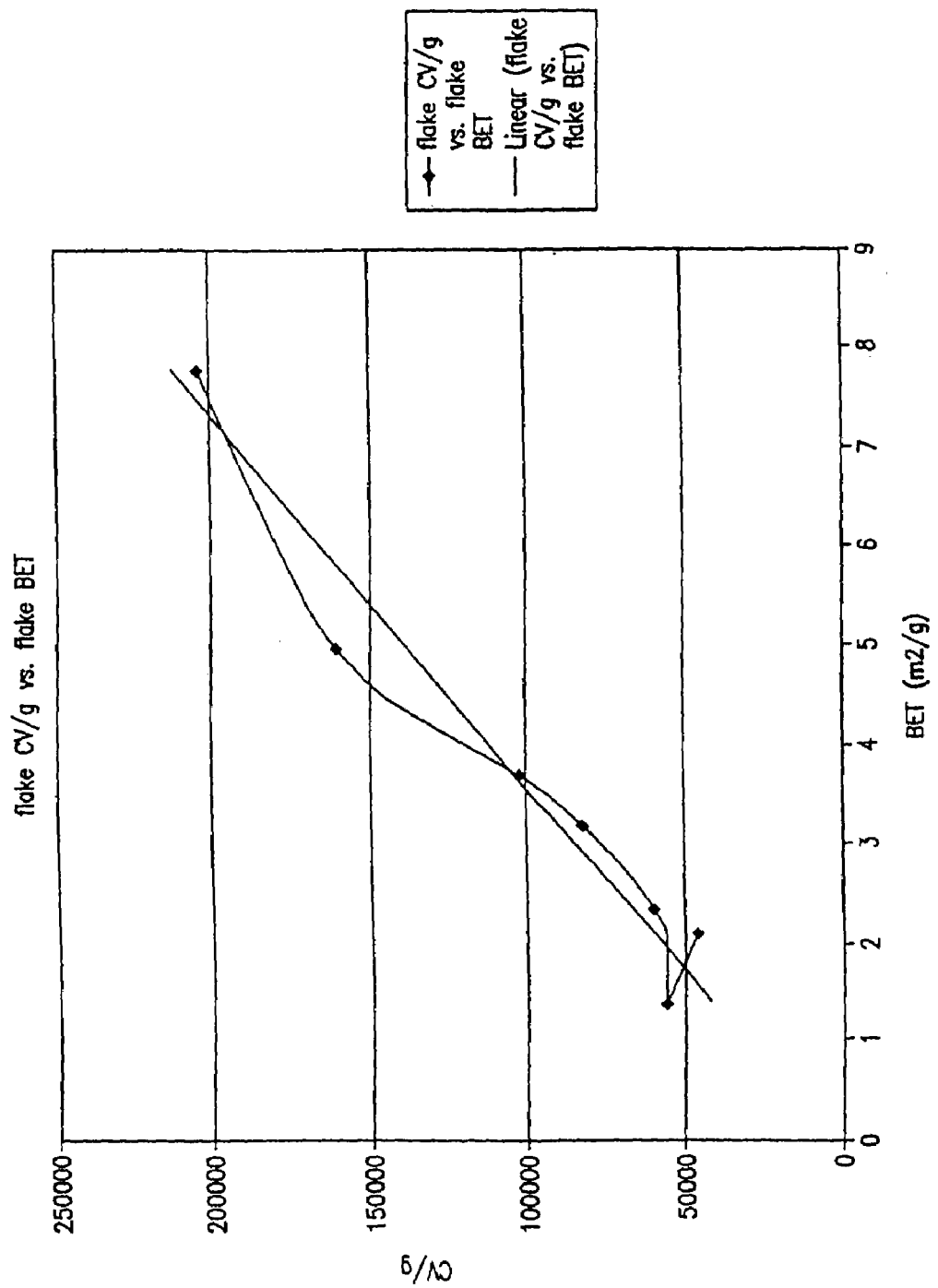
FIG. 1 is a graph showing the BET surface areas of niobium powders and their respective capacitance when formed into anodes and sintered at a temperature of 1150 or 1300° C.

The present invention relates to methods to prepare niobium powders and other metals, preferably having high capacitance and/or low DC leakage capabilities. The present invention further relates to niobium powder and other metals having reduced impurities and methods to reduce these impurities.

The present invention, in part, also relates to metal flakes and wet-milling or wet-grinding processes for making metal flakes. More particularly, the present invention relates to valve metal flakes, including, but not limited to, tantalum flakes and niobium flakes. Examples of niobium flakes are described in U.S. patent application Ser. No. 09/071,537 and in PCT Application US97/19949, which are hereby incorporated in their entireties by reference. Examples of tantalum flakes are described in U.S. Pat. Nos. 5,580,516; 5,448,447; 5,261,942; 5,242,481; 5,211,741; 4,940,490; and 4,441,927, which are incorporated herein in their entireties by reference. Other metal flakes, methods for making metal flakes, and uses for metal flakes are set forth in the following U.S. Patents, each of which is hereby incorporated in its entirety by reference: U.S. Pat. Nos. 4,684,399; 5,261,942; 5,211,741; 4,940,490; 5,448,447; 5,580,516; 5,580,367; 3,779,717; 4,441,927; 4,555,268; 5,217,526; 5,306,462; 5,242,481; and 5,245,514.

The present invention is useful in wet-milling to make flakes of any metal. With respect to the flaked metal, the flaked metal can be characterized as flat, plate shaped, and/or platelet. Preferably, the flaked metal can have an aspect ratio (ratio of diameter to thickness) of from about 3 to about 300, and preferably, from about 3 to about 30. The flaked metal can have enhanced surface area due to its morphology. Preferably, the BET surface area of the flaked metal is at least 0.15 m$^2$/g. For some metals, the BET surface area is preferably at least about 1.0 m$^2$/g and even more preferably, at least about 2.0 m$^2$/g, particularly for flaked niobium. Preferred ranges of BET surface area for the flaked niobium are from about 1.0 m$^2$/g to about 5.0 m$^2$/g and more preferably from about 2.0 m$^2$/g to about 5.0 m$^2$/g or from about 2.0 m$^2$/g to about 4.0 m$^2$/g. For tantalum flakes, the BET surface area is preferably less than about 0.7 m²/g and more preferably from about 0.4 m²/g to about 0.6 m²/g. The BET ranges are based on pre-agglomerated flaked metal.

The flaked metal can optionally have a significant oxygen and/or phosphorus content, such as by doping or other oxygen or phosphorus introduction methods as disclosed, for example, in U.S. application Ser. No. 09/071,537, now U.S. Pat. No. 6,051,044, incorporated in its entirety by reference herein.

The flaked metal can be agglomerated. The flaked metal powder can also be hydrided or non-hydrided. The agglomerated flaked metal preferably has a Scott Density of less than about 35 g/in³, and more preferably from about 10 to about 35. The unagglomerated flaked metal powder preferably has a Scott Density of less than about 12, and more preferably, less than about 5 g/in³. Preferably, the agglomerated flaked metal has a flow of greater than 80 mg/s, more preferably from about 80 mg/s to about 500 mg/s.

In general, the valve metal, such as niobium, can be prepared by taking a niobium ingot and making the ingot brittle by subjecting it to hydrogen gas for hydriding. The hydrided ingot can then be crushed into an angular powder, for instance, with the use of a jaw crusher and impact milled one or more times. The angular powder can then be cleaned with the use of an acid leach or the like. The hydrogen can then be removed by heating in a vacuum and the degassed angular powder can then be subjected to milling, such as with use of a stirred ball mill where the powder is dispersed in a fluid medium (aqueous or non-aqueous) and the medium may include a lubricating agent such as stearic acid or the like, to form the flaked powder or high surface area powder by the impact of the stainless steel balls moved by the action of rotating bars. Various sizes of flakes or other high surface areas powders can be made by hydrogen embrittlement followed by subjecting the powders to impact milling, for example with use of a fluidized bed jet mill, Vortec milling, or other suitable milling steps.

In more detail, a niobium ingot is hydrided by heating in a vacuum to form an embrittled ingot which is crushed into a powder. The hydrogen in the powders can optionally be removed by heating the particle in a vacuum. The various BET surface areas can be achieved by subjecting the powder to milling, preferably an attritor milling process. Obtaining higher BET surface areas of the powder generally requires longer milling times.

According to an embodiment of the present invention, in preparing the niobium powder of the present invention, the niobium powder is milled at high temperatures and in the presence of at least one liquid solvent. When the niobium powder is being prepared, obtaining higher surface area powder is generally inhibited by a work hardening barrier. The introduction of heat during the milling process or during the surface area formation step can delay the onset of the work hardening barrier. Furthermore, milling at high temperatures ensures that there is substantially no water or no water at all present in the milling solvent. The presence of water in the milling solvent can lead to increased corrosion of the mill body and the media. These corrosion products from the mill body and media ultimately result in such impurities as iron, nickel, chromium, and the like and act as contamination to the resulting particles.

When making such high surface areas, it is preferred to use a 30-S Szegvari attritor mill using 1,000 lbs. ³⁄₁₆" SS media, and approximately 40 pounds of niobium powder with the mill set at a rotation of approximately 130 rpm. Also, the mill will contain a sufficient amount of a medium on the order of 13 or more gallons.

Preferably, the milling occurs at temperatures sufficient to: improve upon the formation of higher surface area metal powder; decrease the amount of impurities in the niobium powder; decrease DC leakage of a capacitor anode formed from the niobium powder; and/or increase capacitance of a capacitor anode formed from the niobium powder. Preferably, the milling temperature is at temperatures of 300° F. or more. More preferably, the milling temperature is at a temperature of from about 300° F. to about 420° F. and, even more preferably, from about 330° F. to about 380° F. Preferably, the milling occurs in a ball mill, and more preferably in an attritor ball mill.

With respect to the liquid solvent, preferably, the solvent is tolerable with respect to the particular elevated temperatures used and should remain a liquid during the entire milling process. Furthermore, the solvent is preferably a glycol type solvent, such as polyethylene glycol or tetraethylene glycol. Other suitable examples of solvents include, but are not limited to, Dowtherm® fluids from Dow Chemical. With respect to the amount of solvent present during the milling step, preferably the solvent is present in an amount to permit the milling of the powder to form the niobium powder of the present invention, which is preferably a flaked niobium powder. Amounts such as from about ½ gallon to about 2 gallons per 3–5 lbs. of niobium are preferred; and more preferably about 1 gallon of liquid solvent for about every 4 lbs. of metal, such as niobium.

The solvent can be fluorinated fluid. For the purposes of the present invention the fluorinated fluid is a liquid, and may be considered a solvent. Examples of such fluorinated compounds include, but are not limited to, perfluorocarbons in general and more preferably perfluoropolyethers, aliphatic perfluorocarbon compounds, perfluoromorpholines, perfluoroamines, highly fluorinated amines, and the like. Specific examples include perfluoroalkanes such as perfluorooctane, perfluoroheptane, perfluorohexane, perfluoroheptane. Examples of perfluoroamines include perfluorotributal amine, perfluorotriethylamine, perfluorotriisopropyl amine, perfluorotriarylamine, and perfluoromorpholines, such as perfluoro-N-methyl-morpholine, perfluoro-N-ethyl-morpholine, and perfluoro-N-isopropylmorpholine. For purposes of this present invention, perfluoro involves the replacement of all or substantially all of the hydrogen atoms by fluorine atoms.

Commercially available fluorinated solvents include LS-190, LS-215, LS-260 (available from Montefluos, Inc. Italy) and Hostinert 175, 216, and 272 (available from Hoechst Celanese). Other examples of suitable fluorinated solvents include the Krytox® solvents available from DuPont which are low molecular weight-fluorine end capped homopolymers of hexafluropropylene epoxy. Other suitable fluorinated solvents that can be used in the present invention during the milling process include, but are not limited to, the FLUORINERT line of fluorinated solvents, FC-40, FC-70, FC-71, FC-74, FC-75, FC-77, FC-84, FC-5311, FC-5312, and the like, all from the 3 M Company. Other fluorinated fluids which may be used include Vertrel7 XF ($C_5H_2F_{10}$) or Freon TF from DuPont, Wilmington, Del., the fluorinated polyethers HT70, HT85, HT90, HT100, HT110, HT135, HT200, HT230, HT250 and HT270, and the perfluorinated polyethers sold as GALDEN, all from Ausimont USA, Inc., although oxygen-free fluorinated fluids are preferred. The Ausimont USA, Inc. solvent designations indicate the boiling point of each solvent.

Particularly preferred fluorinated fluids for wet-milling according to the present invention include perfluorinated fluids, more preferably, perfluorinated perfluoroalkanes.

One exemplary perfluorinated fluid is the 3M performance fluid PF-5080. PF-5080 is a non-ozone depleting perfluorohexane compound that has a boiling point of 102° C., a viscosity of 0.7 cSt at room temperature (25° C.), no flash point, and a 11 ppm solubility of water at room temperature (25° C). PF-5080 is a particularly preferred milling solvent due to the strength of the C—F bonds and the ability to support free oxygen. As with other perfluorinated fluids, the strength of the C—F bond provides for lower carbon contamination in the resulting flakes and the solvents ability to support free oxygen provides for lower iron contamination in the flakes. An additional benefit to using a perfluorinated fluid, such as PF-5080, as a milling solvent is that acid leaching can be eliminated. Unlike heretofore available processes using ethanol, which generally used an acid leach after attritor milling to remove carbon and iron contaminates, the present process which uses a fluorinated fluid can generally avoid an acid leach. The elimination of carbon and iron contaminants is particularly important in the manufacture of valve metal flakes, such as tantalum flakes and niobium flakes. Other fluorocarbon solvents may be used and typically have boiling ranges of from about 30° C. to about 250° C., depending upon a number of factors including the length of the carbon chain. At least partially fluorinated solvents are preferred, particularly those fluorocarbon solvents having at least about 20% by weight fluorine atoms per molecule.

Mixtures of the foregoing fluorinated fluids can also be used according to the present invention. Additionally, or alternatively, it is envisioned that a solid fluorinated compound or composition dissolved in one or more appropriate solvent can be used as the fluorinated fluid according to the present invention.

Furthermore, with respect to milling at high temperatures, the milling can occur with different sets of temperatures. For instance, milling can start out at one temperature, for instance 300° F., and then after a certain amount of time can be increased to a higher temperature and so on. Also, milling can begin at an elevated temperature above 300° F. and then be decreased at a later time during milling. The milling time can be any of the milling times described above and is preferably from about 30 minutes to about 10 hours or more preferably from about 30 minutes to about 5 hours.

The milling at high temperatures or elevated temperatures has the advantage of lowering contamination levels, including reducing the amounts of carbon, iron, chromium, and/or nickel, and therefore, a more purified niobium powder is formed. In addition, the niobium powder leads to a lower DC leakage and/or a higher capacitance when capacitor anodes are made from the niobium powder. In addition, milling at elevated temperatures reduces the length of milling time to achieve the same surface area, and thus is an effective way to reduce the cost of manufacturing the niobium powder. Furthermore, the process of milling at elevated temperatures can be combined with the deoxidization step described below to result in a combined multi-step process which can lead to an even higher purity and/or higher capacitance niobium powder.

Preferably, in such a milling process, intermittently the niobium powder, which is being milled, is subjected to a deoxidation. Any deoxidation method can be used, such as magnesium deoxidation. Preferably, a high temperature magnesium deoxidation is used. Other deoxidation methods that can be used include, but are not limited to, getter composites like getter methods, such as those recited in U.S. Pat. No. 4,960,471 incorporated in its entirety by reference herein. After such a step, the niobium powder can then be acid leached to remove any residual magnesium, if this type of deoxidation method is used. Afterwards, the niobium powder can then be subjected to further milling, such as attritor milling. These additional steps which can be used any number of times is preferably used for purposes of making niobium powders having a high capacitance capability. The deoxidation with or without an acid leaching has the ability to reduce, if not eliminate, the shattering or breaking of the flaked particles thus permitting a higher surface area and also a higher capacitance capability for the niobium powders when formed into capacitor anodes.

The deoxidization step(s), like high temperature magnesium deoxidation, preferably makes the niobium powder more ductile or returns the niobium powder to a more ductile state for further milling. Without wishing to be bound by any theory, it is believed that the deoxidation step has the ability to remove interstitial oxides from the niobium powder and relieves the stress on the particles. Since interstitial oxygen increases as a function of milling time and, at saturation levels for a given flaked surface, can result in the shattering or breaking of a particle, the deoxidation step overcomes these problems to permit the formation of a niobium powder which has higher capacitance capability. Preferably, the first deoxidation step occurs before or when the niobium powder reaches a BET surface area of approximately 1.5 $m^2/g$ during the milling process and can occur at intermittent steps thereafter such as before or when the niobium powder reaches a BET surface area of approximately 4.5 $m^2/g$ and then before or when the niobium powder reaches a BET surface area of about 10.0 $m^2/g$ and so on. The deoxidation step can be used any number of times and it is preferred to use the deoxidation step before the work hardening barriers described above are encountered. Preferably, if a magnesium deoxidation is used, from about 4% to about 6% magnesium by total weight of niobium is used during the magnesium deoxidation step and the temperature at which this magnesium deoxidation step occurs is preferably at a temperature of from about 700 to about 1600° C., and more preferably from about 750 to about 950° C., and most preferably from about 750 to about 800° C. The magnesium deoxidation preferably is accomplished in an inert atmosphere, like argon. Also, the magnesium deoxidation is generally for a sufficient time and at a sufficient temperature to remove at least a significant portion of the oxygen in the niobium powder. More preferably, the length of time for the magnesium deoxidation is from about 20 minutes to about 3 hours, and more preferably from about 45 minutes to about 60 minutes. The magnesium that is used generally vaporizes and precipitates out, e.g. as $MgO_2$, for instance, on the cold wall of the furnace in this magnesium deoxidation step. Any remaining magnesium is the preferably substantially removed by any process such as acid leaching with a dilute nitric acid and hydrofluoric acid solution.

After milling, the niobium powder is then subjected to a heat treatment and, preferably the niobium powder can have a phosphorus content to help in minimizing the reduction in surface area during the heat treatment. The heat treatment can be any temperature sufficient to generally cause agglomeration and preferably without reducing the surface area. A temperature for heat treatment which can be used is approximately 1100° C. for 30 minutes. However the temperature and time can be modified to ensure that the high BET surface area is not reduced.

Other valve metals and other metal powders can be prepared in the same or similar manner as described above in the various methods.

The methods of the present invention have the ability to reduce or minimize the amount of impurities present in niobium powders. Niobium powders processed through the present invention preferably have carbon levels of 200 ppm or lower and more preferably at levels of from about 40 ppm to about 200 ppm. Furthermore, the iron, nickel, and chromium levels are also reduced and are preferably present in a combined amount of 200 ppm or less and more preferably at combined levels of from about 5 ppm to about 200 ppm. These amounts are well below conventional impurity amounts for niobium powder and other valve metals. Preferably, the niobium powder of the present invention has a carbon amount of from about 40 to about 200 ppm when the surface area is about 1.0 $m^2/g$ and a carbon amount of less than 250 ppm when the BET surface area of the niobium powder is from about 2 to about 4.5 $m^2/g$ and the combined amount of Fe(Ni/Cr is less than 100 ppm when the BET surface area of the niobium powder is about 1.0 $m^2/g$ and less than about 400 ppm when the BET surface area is from about 2.0 $m^2/g$ to about 4.5 $m^2/g$. The methods of the present invention would also lead to improved purity levels of other valve metals.

Due to the lower amount of impurities as well as other reasons, when the niobium powder of the present invention is formed into a capacitor anode, the capacitor anode has a reduced DC leakage. The DC leakage can be reduced by at least 5%, and more preferably at least 10%, and most preferably at least 15% to about 20% due to the processing of the niobium powder using the methods of the present invention.

The present invention further permits a milling time to form a particular BET surface area to be significantly reduced. For instance, the same BET surface area of a niobium powder can be achieved in about 50% to about 90% of the conventional milling time, and more preferably in about 50% or less of the milling time typically needed to achieve the same BET surface area for a particular niobium powder.

The niobium powders or other metal powders (e.g. flaked, angular, nodular, and mixtures thereof) formed from the process of the present invention preferably have a BET surface area of at least about 0.5 $m^2/g$, and more preferably at least about 1.0 $m^2/g$, or at least about 2.0 $m^2/g$, and even more preferably at least about 3.0 $m^2/g$ or at least about 4.0 $m^2/g$ and most preferably at least 5.1 $m^2/g$ at least 5.5 $m^2/g$, and at least about 6.0 $m^2/g$, and ranges from about 6.0 to about 15.0 $m^2/g$, and from about 8.0 to about 15.0 $m^2/g$. The BET ranges are based on pre-agglomerated niobium powders. The niobium powder can be hydrided or non-hydrided. Also, the niobium powder can be agglomerated.

With respect to the preferred flaked niobium powder, the flaked niobium powder can be characterized as flat, plate shaped, and/or platelet. Also, the flaked niobium powder can have an aspect ratio (ratio of diameter to thickness) of from about 3 to about 300, and preferably, from about 200 to about 300. The flaked niobium powder permits enhanced surface area due to its morphology. Preferably, the BET surface area of the flaked niobium powder is from about 0.5 $m^2/g$ to 15.0 $m^2/g$, and more preferably from about 1.0 $m^2/g$ to about 15.0 $m^2/g$, and even more preferably at least 5.5 $m^2/g$ and at least about 6.0 $m^2/g$, and even more preferably, is at least about 7.0 $m^2/g$. Preferred ranges of BET surface area for the flaked niobium powder are from about 6.0 $m^2/g$ to about 15.0 $m^2/g$ and more preferably from about 8.0 $m^2/g$ to about 12.0 $m^2/g$ or from about 9.0 $m^2/g$ to about 11.0 $m^2/g$. The BET ranges are based on pre-agglomerated flaked niobium powders.

The flaked niobium powder can be agglomerated. The flaked niobium powder can also be hydrided or non-hydrided. The agglomerated flaked niobium powder preferably has a Scott Density of less than about 35 $g/in^3$, and more preferably about 10 to about 35 $g/in^3$. The unagglomerated flaked niobium powder preferably has a Scott Density of less than about 12, and more preferably, less than about 5 $g/in^3$. Preferably, the agglomerated flaked niobium powder has a flow of greater than 80 mg/s, more preferably from about 80 mg/s to about 500 mg/s.

The niobium powder can optionally have an oxygen content. The amount of oxygen content can be about 2,000 ppm or below or above. The niobium powder for instance can have has an oxygen content of from about 2,000 ppm to about 60,000 ppm. Alternatively, the flaked niobium or any other type of niobium can have a low oxygen content, such as less than 1,000 ppm.

Further, the niobium powder can also have a phosphorus content, such as by doping with phosphorus alone or with oxygen. The doping of the niobium powder with phosphorus is also optional. In one embodiment of the present invention, the amount of phosphorus doping of the niobium powder is less than about 400 ppm, more preferably less than about 100 ppm, and most preferably less than about 25 ppm. Other conventional additives, including dopants, can be included.

The niobium powder can optionally be doped with nitrogen as described in International Published Application No. WO 99/57739 published May 3, 1999, incorporated in its entirety, by reference herein.

The various niobium powders described above can be further characterized by the electrical properties resulting from the formation of a capacitor using the niobium powders of the present invention. In general, the niobium powders of the present invention can be tested for electrical properties by pressing the niobium powder into an anode and sintering the pressed niobium powder at appropriate temperatures and then anodizing the anode to produce an electrolytic capacitor anode which can then be subsequently tested for electrical properties.

Preferably, the niobium powders and other valve metals of the present invention have excellent impregnation properties as reflected by an improved or lower dissipation factor, (Df) when formed into capacitor anodes.

Accordingly, another embodiment of the present invention relates to capacitors formed from the nitrogen containing niobium powders of the present invention. Anodes made from some of the niobium powders of the present invention can have a capacitance of greater than about 62,000 CV/g. Also, the capacitor anodes preferably have a low Df.

Accordingly, the present invention further relates to niobium powder which when formed into an electrolytic capacitor anode, the anode has a capacitance of above 62,000 CV/g and more preferably above 70,000 CV/g. Preferably, the niobium powder when formed into an electrolytic capacitor anode, the anode has a capacitance of from about 65,000 CV/g to about 150,000 CV/g and more preferably from about 65,000 CV/g to about 175,000 CV/g and most preferably from about 65,000 CV/g to about 250,000 CV/g. These capacitance are measured in the following manner and the niobium powder is formed into an anode in the following way:

A tantalum can may be used to produce an anode. The tantalum can measure (0.201 inches in diameter ×0.446 inches in length) and is open at one end and has a tantalum wire welded to the outside. The tantalum can is free-filled with low Scott density niobium powder, weighed and sintered. Sintering temperatures may range from 1000° C. to 1500° C. and preferably from 1100° C. to 1300° C. The sintered niobium filled tantalum can is then anodized using a formation voltage of 10 Vf to 50 Vf and preferably 20 Vf to 35 Vf. The anodized and sintered niobium filled tantalum can is then tested for capacitance (µF). The capacitance (µF) of an empty tantalum can is subtracted from the capacitance of the niobium filled tantalum can to yield a true capacitance (µF) reading. The resultant electrical analysis is reported in µFV/g.

In forming the capacitor anodes of the present invention, a sintering temperature is used which will permit the formation of a capacitor anode having the desired properties. Preferably, the sintering temperature is from about 1100° C. to about 1750° C., more preferably from about 1100° C. to about 1400° C., and most preferably from about 1150° C. to about 1300° C.

The anodes formed from the niobium powders of the present invention are preferably formed at a voltage of less than about 60 volts, preferably from about 30 to about 50 volts, and more preferably at about 40 volts. Lower forming voltages are also possible, such as about 30 volts or less. Preferably, the working voltages of anodes formed from the niobium powders of the present invention are from about 4 to about 16 volts and more preferably from about 4 to about 10 volts. Also, the anodes formed from the niobium powders of the present invention preferably have a DC leakage of less than about 5.0 na/CV. In an embodiment of the present invention, the anodes formed from some of the niobium powders of the present invention have a DC leakage of from about 5.0 na/CV to about 0.50 na/CV.

With the high capacitance niobium powder, higher forming voltages and higher working voltages can be used, such as from about 50 to about 80 volts formation and from about 10 to about 20 working voltage. Also, an additional benefit of the present invention is the improvement in DC leakage, i.e., stable or lower DC leakage as the BET of the niobium increases.

The present invention also relates to a capacitor in accordance with the present invention having a niobium oxide film on the surface thereof. Preferably, the niobium oxide film comprises a niobium pentoxide film.

Besides niobium, the present invention is applicable to any metal which can be milled, such as valve metals including tantalum. The resulting benefits, such as higher BETs, higher capacitance of the anode formed from the metal powder and/or the related forming voltage, working voltage, and improved or stable DC leakage are also considered part of the present invention.

The capacitors of the present invention can be used in a variety of end uses such as automotive electronics; cellular phones; computers, such as monitors, mother boards, and the like; consumer electronics including TVs and CRTs; printers/copiers; power supplies; modems; computer notebooks; and disk drives.

The present invention will be further clarified by the following examples, which are intended to be exemplary of the invention.

TEST METHODS

CAPACITANCE METHOD A: Flake CV/g Electrical Measurements

[1] Anode Preparation:
  (a) Prepare N=1 per sample of powder into a fabricated Ta can
    (1) Record the weight of each can before loading with powder
    (2) Fill the can full with powder using no force to compact the powder
    (3) Record the weight of the loaded can.

[2] Anode Sintering:
  (a) 1300° C.×10 minute (profile "A")
  (b) Load N=1 per sample and 1 empty can per sinter in a large tray in such a manner that individual identification can be maintained.

[3] 35V Ef Evaluation:
  (a) 35V Ef @ 60° C. /0.1% H3PO4 Electrolyte 2V/5 minutes or 20 mA/g constant current

[4] DC Leakage/Capacitance-ESR Testing:
  (a) DC Leakage Testing—
    70% Ef (24.5 VDC) Test Voltage
    60 second charge time
    10% H3PO4 @ 21° C.
  (b) Capacitance-DF Testing:
    18% H2SO4 @ 21° C.
    120 Hz CAPACITANCE METHOD B: Flake Powder CV/g Electrical Measurements

[1] Anode Fabrication:
  (a) 2.5 and 3.0 Dp
  (b) non-lubed powder using the Nb 0.025" "expanded leads"
  (c) size=0.197" dia 0.230" length;
  (d) powder wt=340 mg

[2] Anode Sintering (10'/A Ramp):
  (a) 1100° C.*10'
    1200° C.*10'
    1300° C.*10'

[3] 35V Ef Anodization:
  (a) 35V Ef @ 60° C./0.1% H3PO4 Electrolyte
    50 mA/g constant current

[4] DC leakage/Capacitance-ESR Testing:
  (a) DC Leakage Testing—
    70% Ef (24.5 VDC) Test Voltage
    60 second charge time
    10% H3PO4 @ 21° C.
  (b) Capacitance-DF Testing:
    18% H2SO4 @ 21° C.
    120 Hz

[5] 50V Ef Anodization:
  (a) 50V Ef @ 60° C./0.1% H3PO4 Electrolyte
    50 mA/g constant current

[6] DC leakage/Capacitance-ESR Testing:
  (a) DC Leakage Testing—
    70% Ef (35 VDC) Test Voltage
    60 second charge time
    10% H3PO4 @ 21° C.
  (b) Capacitance-DF Testing:
    18% H2SO4 @ 21° C.
    120 Hz Scott Density, oxygen analysis, phosphorus analysis, and BET analysis were determined according to the procedures set forth in U.S. Pat. Nos. 5,011,742; 4,960,471; and U.S. Pat. No. 4,964,906, all incorporated hereby in their entireties by reference herein.

EXAMPLES 1–10

Electron beam produced niobium ingot was hydrided by heating the ingot in a vacuum of $10^{-4}$ torr to 1050° C. holding at 1050° C. for 15 minutes, and then cooling the ingot under vacuum to 600° C. Once the ingot reached 600° C., particle pressure hydrogen was lowered into the furnace chamber at 200 scfh and ingot was cooled under partial pressure hydrogen flow over a period of 48 hours. The vacuum was then pumped down to −28" mercury and then backfilled with argon to −5" Hg. The pressure was maintained until the temperature, as measured by a work thermocouple, stabilized. Air was gradually introduced in increasing pressure such that the work temperature did not rise. The embrittled ingot was crushed into angular powder in a jaw crusher and impact milled and then classified to 5 by 80 microns in an air classifier. Hydrogen was removed from the size-reduced hydrogen-containing particles by heating the particles to 700° C. in a vacuum until pressure was no longer affected by hydrogen being emitted from the particles.

The degassed angular powder was then processed in a 30-S Szegvari attritor stirred ball mill (130 rpm for about 6 hours) where powder dispersed in 15 gal. ethanol medium and 1000 lbs. 3/16" 440C. stainless steel medium was formed into flaked powder by the impact of stainless steel balls moved by the action of rotating bars. After this initial milling, the flaked niobium powder upon measurement had a surface area of about 1.5 m²/g. The flaked niobium powder was then magnesium deoxidized using about 4 to about 6% magnesium by weight of niobium. The magnesium deoxidation occurred at a temperature of about 800° C. and for about 60 minutes. The flaked niobium powder was then removed and acid leached to remove any residual magnesium. This acid leaching was accomplished by creating a slurry containing 40 lbs. of niobium flaked, 400 g/lb. of deionized ice, 200 ml/lb. nitric acid, and 2 ml/lb. hydrofluoric acid and straining and rinsing to a conductivity of 50 μhos. The flaked niobium powder was then reintroduced into a 1-S Szegvari attritor stirred ball mill and further milled in accordance with the parameter set forth in Table 1 for each of the examples. In each of the examples, the average ethanol slurry temperature during the milling was approximately 85° F. and the milling speed was approximately 350 rpm. The variables for each of the examples are set forth in Table 1 as well as the results. In each of the examples set forth in the Table, 0.5 pounds of deoxidized flaked niobium powder was balled milled using 40 pounds of 3/16" 440C stainless steel media in 2/3 gallon of ethanol and optionally with stearic acid in an amount of about 1% wt (2.5 g).

TABLE 1

| Sample No. | Mill time (hrs) | BET (m2/g) | Ds (g/cc) Sinter density | Sinter temp. | Vf | CV/g (flaked) | CV/g @ 2.5Dp (Press Density) | Milling Time (hr.) |
|---|---|---|---|---|---|---|---|---|
| 1 | 0.5 | 2.08 | | 1300° C. | 35 | 46,718 | | 0.5 |
| 2 | 0.75 | 1.39 | | 1300° C. | 35 | 56,186 | | 0.75 |
| 3 | 1 | 2.3217 | | 1300° C. | 35 | 59,768 | | 1.0 |
| 4 | 2 | 3.14 | | 1300° C. | 35 | 83,415 | | 2.0 |
| 5 | 3 | 3.7 | 0.04843 | 1300° C. | 35 | 102,513 | 73,021 | 3.0 |
| 6 | 5 | 10.38 | | 1300° C. | 35 | 129,864 | | 5.0 |
| 7 | 5 | 4.9177 | 0.04442 | 1300° C. | 35 | 120,704 | 85,938 | 5.0[a] |
| 8 | 8 | 7.69 | 0.056024 | 1300° C. | 35 | 123,861 | 88,306 | 8.0[a] |
| 9 | 5 | 4.9177 | 0.052193 | 1150° C. | 20 | 160,916 | 114,672 | 5.0[a] |
| 10 | 8 | 7.69 | 0.046441 | 1150° C. | 20 | 204,498 | 145,632 | 8.0[a] |

[a]EtOH w/stearic acid

After the desired deformation into flake, the niobium powder was then removed and washed to remove any alcohol present. The niobium powder was then washed with a mixture of deionized water, hydrofluoric acid, nitric acid, and hydrochloric acid in an amount of 750 ml/lb. deionized water, 10 ml/lb. hydrofluoric acid, 350/750 ml/lb. nitric acid, and 750 ml/lb. hydrochloric acid, all based on per pound niobium to remove carbon and metal contamination (e.g. iron, nickel, chromium and the like transfered from contact with stainless steel balls). The acid concentrations were about 30% HCl, about 68–70% $HNO_3$ and about 48–51% HF. Afterwards, the niobium powder was again washed with deionized water and then dried. The acid washed flaked powder was dried in air at 150° F. (65° C.).

The various lots of niobium powder were then pressed into an anode mold 5 mm in diameter around a 0.6 mm diameter niobium lead wire to a density of 3.5 g/cc. Samples of the pressed niobium powder were sintered in a vacuum (at less than $10^{-3}$ Pa) at the temperatures indicated in Table 1 for 10 minutes then anodized by applying 20 mA/g constant current at the forming voltage indicated in Table 1 to the anode immersed in 0.1 weight percent phosphoric acid to produce electrolytic capacitor anodes, which were washed and dried. The capacitor performance characteristics, evaluated by measurements on the anodes immersed in 18 wt. % sulfuric acid, are reported in Table 1. Capacitance, determined at a frequency of 120 Hertz, is reported in units of microfarad volts per gram (CV/g) and microfarad volts per cubit centimeter of anode volume (CV/cc); DC leakage, measured after a 1 minute charge of 35 volts, is reported in units of nanoamperes per microfarad-volt (nA/CV).

As can be seen in Table 1 above, and in the Figure, which sets forth the capacitance and BET of the various examples made, the capacitance of the anodes formed from the niobium powders were greatly increased using the process of the present invention which permitted longer milling times without fracturing the flaked niobium powder. As can be seen in Table 1, when a forming voltage of 20 volts was used to form the anode from the flaked niobium powder that was sintered at 1150° C. The capacitance was 204,498 CV/g. In addition, the benefits of using alcohol and preferably ethanol with lubricating agents, like stearic acid was also observed.

EXAMPLES 11–15

In Examples 11–15, the starting niobium powder was prepared in the same manner as described for Examples 1–10. The formed niobium dehydrated chip was then ball milled at elevated temperatures based on the parameters set forth below.

Example 11

2.0 lbs. of niobium dehydrided chip was ball milled using 40 lbs. of 3/16" 440SS media, for 3.5 hrs (sampled at 0.5 hrs and 2 hrs) in 2/3 gal of tetraethylene glycol (TEG) at 350 rpm. The average slurry temperature during the mill was ~330° F. (results listed as 11a through 11c).

Example 12

2.0 lbs. of niobium dehydrided chip was ball milled using 40 lbs. of 3/16" 440SS media, for 5 hrs in 2/3 gal of tetraethylene glycol (TEG) at 350 rpm. The average slurry temperature during the mill was ~330° F. (results listed as 12).

Example 13

2.0 lbs. of niobium dehydrided chip was ball milled using 40 lbs. of 3/16" 440SS media, for 6 hrs in 2/3 gal of tetraethylene glycol (TEG) at 350 rpm. The average slurry temperature during the mill was ~330° F. (results listed as 13).

Example 14

2.0 lbs. of niobium dehydrided chip was ball milled using 40 lbs. of 3/16" 440SS media, for 7.5 hrs (sampled at 6 hrs) in 2/3 gal of tetraethylene glycol (TEG) at 350 rpm. The average slurry temperature during the mill was ~330° F. (results listed as 14a and 14b).

Example 15

2.0 lbs. of niobium dehydrided chip was ball milled using 40 lbs. of 3/16" 440SS media, for 9 hrs. (sampled at 4 hrs and 6 hrs) in 2/3 gal of polyethylene glycol (PEG) at 350 rpm. The average slurry temperature during the mill was ~330° F. (results listed as 15a through 15c).

Example 16

2.0 lbs. of niobium dehydrated chip was balled milled using 40 lbs. of 3/16" 440 SS media for the milling time indicated in Table 2 in 1 gallon of ethanol for every 4 lbs. of niobium at 350 rpm. The average slurry temperature was about 85° F. The notation "Deox flake-remill" means that the niobium was deox treated after about 5 hours and then milled again for the remaining milling time. The milling time for these niobium powders is the combined overall milling time.

TABLE 2

| Example # | Scott Den. (g/in³) | BET (m²/g) | C (ppm) | O (ppm) | Fe/Ni/Cr (ppm) | Can CV/g | Liquid Solvent | Milling Time (hrs.) |
|---|---|---|---|---|---|---|---|---|
| 11a | 18.2 | 0.58 | 46 | | 5 | 13972 | TEG | 0.5 |
| 11b | 6 | 1.35 | 78 | | 35 | 30304 | TEG | 2 |
| 11c | 2.8 | 1.82 | 225 | | 275 | 64535 | TEG | 3.5 |
| 12 | 3.1 | 5.26 | 188 | 23470 | 195 | 96827 | TEG | 5 |
| 13 | 2.6 | 3.23 | 159 | 18550 | 375 | 90125 | TEG | 6 |
| 14a | 2.1 | 3.12 | 300 | 17730 | 225 | 86895 | TEG | 6 |
| 14b | 2.6 | 5.67 | 484 | 36840 | 400 | 93052 | TEG | 7.5 |
| 15a | 4.2 | 0.73 | 165 | 6734 | 35 | 30235 | PEG | 4 |
| 15b | 2.6 | 1.79 | 190 | 13350 | 50 | 52152 | PEG | 6 |
| 15c | 2.3 | 4.41 | 227 | 25710 | 80 | 83132 | PEG | 9 |
| 16a | 5.3 | 1.16 | 163 | 8559 | 135 | 37920 | Once mill-EtOH | 5 |
| 16b | 2.2 | 1.48 | 283 | 8386 | 425 | 53662 | Deox flake-remill EtOH | 8 |
| 16c | 1.9 | 3.63 | 393 | 22990 | 1200 | 90789 | Deox flake-remill EtOH | 11 |
| 16d | 1.8 | 3.71 | 387 | 15900 | 1100 | | Deox flake-remill EtOH | 11 |
| 16e | 1.8 | 4.16 | 466 | 20810 | 1100 | 96158 | Deox flake-remill EtOH | 12 |

As can be seen from Table 2, obtaining high surface area niobium flaked powder can be achieved in relatively short periods of time by milling at elevated temperatures. Furthermore, the contaminants can be minimized using elevated hot milling temperatures. The anodes formed from the niobium flaked powder resulted in acceptable capacitance as set forth in Table 2.

Figure 2:
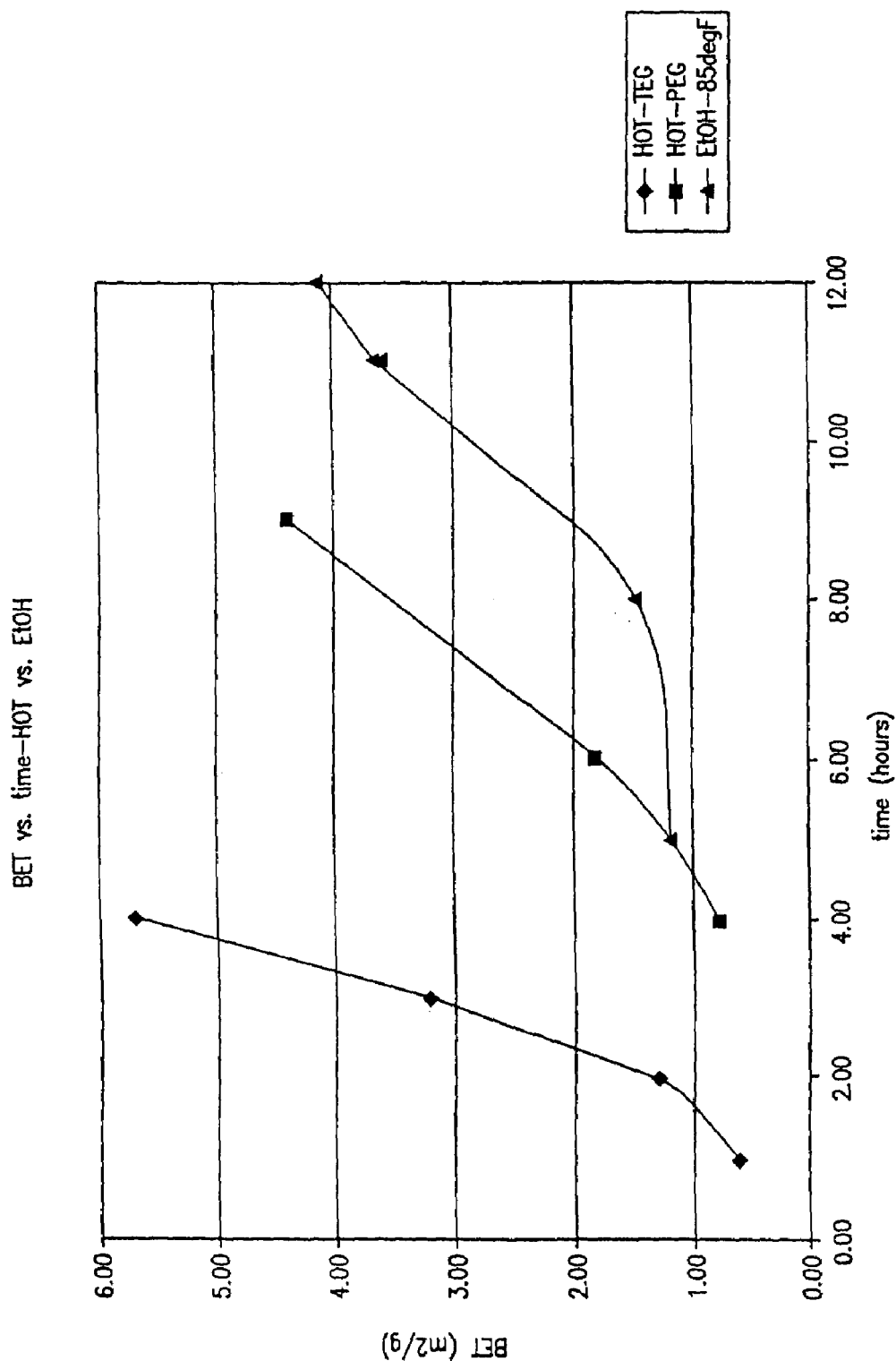
FIG. 2 is a graph showing BET surface areas of niobium powders prepared differently and their respective milling times to form niobium powders having high BET surface areas.
Figure 3:
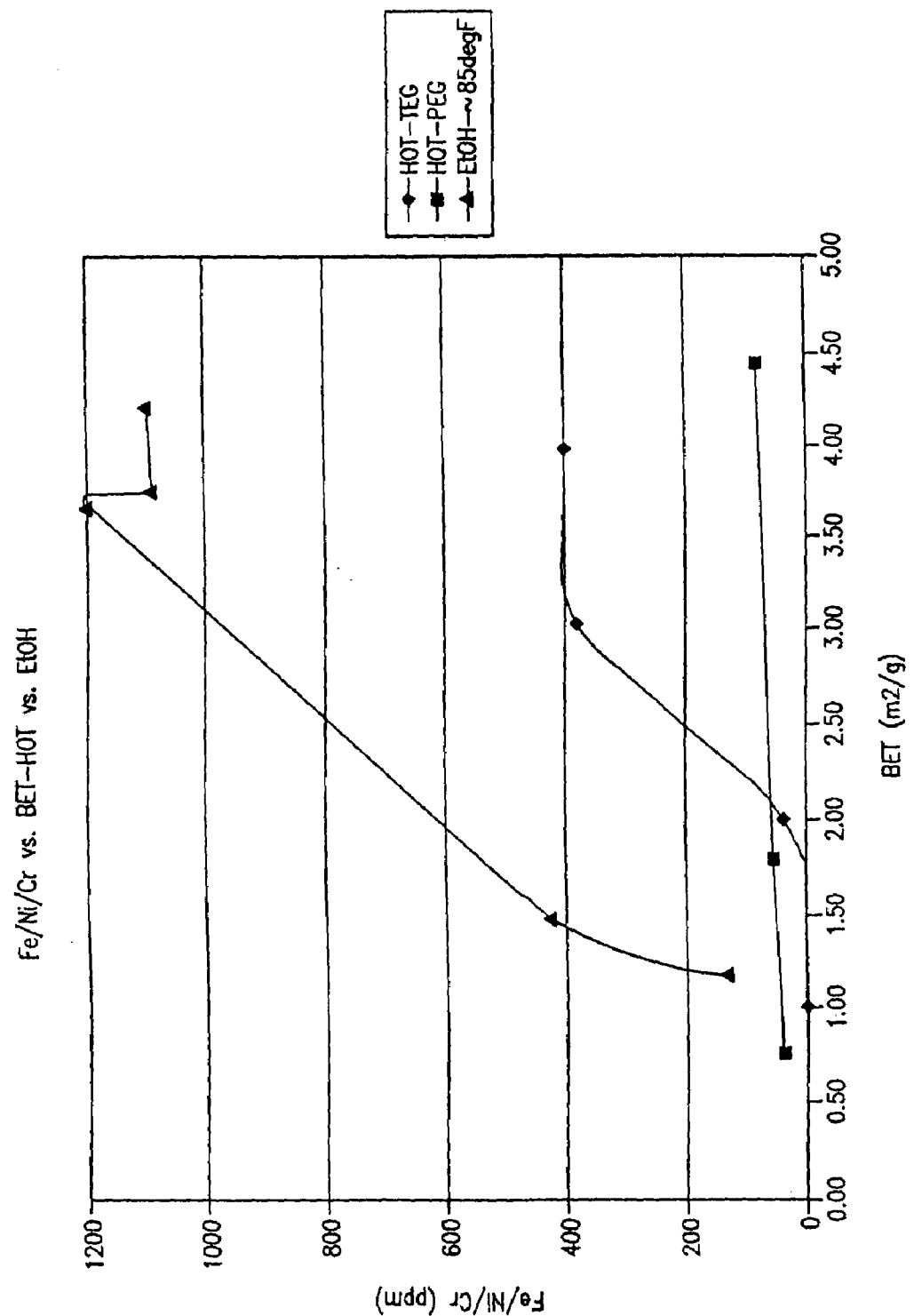
FIG. 3 is a graph showing the amount of Fe/Ni/Cr impurities present in niobium powders having various BET surface areas and prepared differently.

In more detail, a comparison of niobium powders prepared according to the present invention are compared with a milling process using lower temperatures and an ethanol solvent. As can be seen in FIG. 2, the time to form higher BET surface areas was significantly shortened using the process of the present invention wherein hot-TEG and hot-PEG are representative of the present invention and EtOH at approximately 85° F. is represented of the state of the art technology. Further, FIG. 3 compared the same three niobium powders (as in FIG. 2) and the amount of Fe/Ni/Cr contaminants was significantly lowered using the processes of the present invention. This is especially true when the surface area was greater than 1.0 m²/g or more. Finally, FIG. 4 compared the amount of carbon contaminants present in the same three niobium samples and again, it can be seen that the amount of carbon contaminants was significantly lowered at a variety of surface areas. Thus, the methods of the present invention have the ability to lower the amount of contaminants and provide high surface area metal powders for a variety of uses, such as in capacitors, and permit the formation of such high surface area powders in significantly reduced milling times.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims and equivalents thereof.

What is claimed is:

1. A niobium powder having a carbon content of from about 40 ppm to about 200 ppm and a iron, nickel, and chromium content of from about 5 ppm to about 200 ppm, wherein said niobium powder has a flow of greater than 80 mg/s; and
   wherein said niobium powder is agglomerated and has a Scott density of less than about 35 g/in$^3$; or
   wherein said niobium powder is unagglomerated and has a Scott density of less than about 12 g/in$^3$.

2. The niobium powder of claim 1, wherein said carbon amount is from about 50 to about 150 ppm.

3. A niobium powder having a carbon amount of from about 40 to about 200 ppm when the BET surface area is about 1.0 m$^2$/g and a carbon amount of less than 250 ppm when the BET surface area of the niobium powder is from about 2 to about 4.5 m$^2$/g and the combined amount of Fe/Ni/Cr is less than 100 ppm when the BET surface area of the niobium powder is about 1.0 m$^2$/g and less than about 400 ppm when the BET surface area of the niobium powder is from about 2.0 m$^2$/g to about 4.5 m$^2$/g;
   wherein said niobium powder is agglomerated and has a Scott density of less than about 35 g/in$^3$; or
   wherein said niobium powder is unagglomerated and has a Scott density of less than about 12 g/in$^3$.

4. A capacitor anode comprising the niobium powder of claim 1.

5. A capacitor anode comprising the niobium powder of claim 2.

6. A capacitor anode comprising the niobium powder of claim 3.

7. The niobium powder of claim 1, wherein said niobium powder is flaked.

8. The niobium powder of claim 3, wherein said niobium powder is flaked.

9. The niobium powder of claim 1, wherein said niobium powder has a BET surface area of from about 1.0 m$^2$/g to about 4.5 m$^2$/g.

10. The niobium powder of claim 1, wherein said niobium powder has a BET surface area of at least 0.15 m$^2$/g.

11. The niobium powder of claim 1, wherein said niobium powder further comprises oxygen, phosphorous, or both.

12. The niobium powder of claim 1, wherein said niobium powder is agglomerated.

13. The niobium powder of claim 3, wherein said niobium powder has a flow of greater than 80 mg/s.

14. The niobium powder of claim 1, wherein the niobium powder has a flow of from about 80 mg/s to about 500 mg/s.

15. The niobium powder of claim 1, wherein said niobium powder has a BET surface area of from about 1 m$^2$/g to about 10.0 m$^2$/g.

16. The niobium powder of claim 1, wherein said niobium powder has a shape which is flake, angular, nodular, or mixtures thereof.

17. The niobium powder of claim 1, wherein said niobium powder has a shape that is nodular.

18. The niobium powder of claim 1, wherein said niobium powder has a BET surface area of from about 6 m$^2$/g to about 15 m$^2$/g.

19. The niobium powder of claim 1, wherein said niobium powder has an oxygen content of about 2,000 ppm or below.

20. The niobium powder of claim 1, wherein said niobium powder has an oxygen content of from about 2,000 ppm to about 60,000 ppm.

21. The niobium powder of claim 1, wherein said niobium powder further comprises phosphorous in the amount of less than about 400 ppm.

22. The niobium powder of claim 1, wherein said niobium powder comprises nitrogen.

23. The niobium powder of claim 1, wherein said niobium powder comprises nitrogen in an amount of at least 300 ppm.

24. The capacitor anode of claim 4, wherein said anode has a capacitance of at least about 62,000 CV/g.

25. The capacitor anode of claim 4, wherein said anode has a capacitance of at least about 70,000 CV/g.

26. The capacitor anode of claim 4, wherein said anode has a capacitance of from about 65,000 CV/g to about 250,000 CV/g.

27. The capacitor anode of claim 4, wherein said anode is formed at a voltage of less than about 60 volts.

28. The capacitor anode of claim 4, wherein said anode has a working voltage of from about 4 to about 16 volts.

29. The capacitor anode of claim 4, wherein said anode has a DC Leakage of less than about 5.0 na/CV.

30. The capacitor anode of claim 4, wherein said anode has a formation voltage of from about 50 to about 80 volts.

31. The capacitor anode of claim 4, wherein said anode has a working voltage of from about 10 to about 20 volts.

32. A hydrided niobium powder having a carbon content of from about 40 ppm to about 200 ppm and a iron, nickel, and chromium content of from about 5 ppm to about 200 ppm.

33. The hydrided niobium powder of claim 32, wherein said carbon amount is from about 50 to about 150 ppm.

34. The hydrided niobium powder of claim 32, wherein said niobium powder has a BET surface area of from about 1.0 m$^2$/g to about 4.5 m$^2$/g.

35. The hydrided niobium powder of claim 32, wherein said niobium powder has a BET surface area of at least 0.15 m$^2$/g.

36. The hydrided niobium powder of claim 32, wherein said niobium powder further comprises oxygen, phosphorous, or both.

37. The hydrided niobium powder of claim 32, wherein said niobium powder is agglomerated.

38. The hydrided niobium powder of claim 32, wherein said niobium powder is agglomerated and has a Scott density of less than about 35 g/in$^3$.

39. The hydrided niobium powder of claim 32, wherein said niobium powder is unagglomerated and has a Scott density of less than about 12 g/in$^3$.

40. The hydrided niobium powder of claim 32, wherein said niobium powder has a flow of greater than 80 mg/s.

41. The hydrided niobium powder of claim 32, wherein the niobium powder has a flow of from about 80 mg/s to about 500 mg/s.

42. The hydrided niobium powder of claim 32, wherein said niobium powder has a BET surface area of from about 1 m$^2$/g to about 10.0 m$^2$/g.

43. The hydrided niobium powder of claim 32, wherein said niobium powder has a shape which is flake, angular, nodular, or mixtures thereof.

44. The hydrided niobium powder of claim 32, wherein said niobium powder has a shape that is nodular.

45. The hydrided niobium powder of claim 32, wherein said niobium powder has a BET surface area of from about 6 $m^2/g$ to about 15 $m^2/g$.

46. The hydrided niobium powder of claim 32, wherein said niobium powder has an oxygen content of about 2,000 ppm or below.

47. The hydrided niobium powder of claim 32, wherein said niobium powder has an oxygen content of from about 2,000 ppm to about 60,000 ppm.

48. The hydrided niobium powder of claim 32, wherein said niobium powder further comprises phosphorous in the amount of less than about 400 ppm.

49. The hydrided niobium powder of claim 32, wherein said niobium powder comprises nitrogen.

50. The hydrided niobium powder of claim 32, wherein said niobium powder comprises nitrogen in an amount of at least 300 ppm.

51. The niobium powder of claim 3, wherein said niobium powder has an oxygen content of about 2,000 ppm or below.

52. The niobium powder of claim 3, wherein said niobium powder has an oxygen content of from about 2,000 ppm to about 60,000 ppm.

* * * * *